(12) United States Patent
Wentink (10) Patent No.: US 7,136,392 B2
(45) Date of Patent: Nov. 14, 2006

(54) SYSTEM AND METHOD FOR ORDERING DATA MESSAGES HAVING DIFFERING LEVELS OF PRIORITY FOR TRANSMISSION OVER A SHARED COMMUNICATION CHANNEL

(75) Inventor: Maarten Menzo Wentink, Utrecht (NL)

(73) Assignee: Conexant Systems, Inc., New Port Beach, CA (US)

( * ) Notice: Subject to any disclaimer, the term of this patent is extended or adjusted under 35 U.S.C. 154(b) by 885 days.

(21) Appl. No.: 09/943,803

(22) Filed: Aug. 31, 2001

(65) Prior Publication Data

US 2003/0053469 A1    Mar. 20, 2003

(51) Int. Cl.
*H04L 12/413* (2006.01)

(52) U.S. Cl. ...................... 370/445; 370/412

(58) Field of Classification Search ................ 370/445, 370/446, 447, 448, 461, 462, 395.41, 395.42, 370/455, 412, 413, 428, 429, 468, 395.2, 370/395.21

See application file for complete search history.

(56) References Cited

U.S. PATENT DOCUMENTS

| | | | |
|---|---|---|---|
| 5,812,526 A * | 9/1998 | Chang et al. .............. 370/230 |
| 6,470,025 B1 * | 10/2002 | Wilson et al. .............. 370/462 |
| 6,483,846 B1 * | 11/2002 | Huang et al. ............... 370/445 |
| 6,693,912 B1 * | 2/2004 | Wang ......................... 370/401 |
| 6,741,559 B1 * | 5/2004 | Smeulders et al. ......... 370/230 |
| 6,760,308 B1 * | 7/2004 | Ghanma et al. ............ 370/235 |
| 6,859,438 B1 * | 2/2005 | Haddock et al. ............ 370/235 |
| 2002/0163933 A1 * | 11/2002 | Benveniste .................. 370/465 |
| 2003/0012167 A1 * | 1/2003 | Benveniste .................. 370/338 |

* cited by examiner

*Primary Examiner*—Ajit Patel
(74) *Attorney, Agent, or Firm*—Thomas, Kayden, Horstemeyer & Risley, LLP (57) ABSTRACT

Stations of a communication network have internal queues for accumulating and transmitting data messages over a shared communication channel. Each queue within a station accumulates and transmits data messages that have a different level of priority than those accumulated and transmitted by other internal queues of that station. While preferential access to the shared channel is given to data messages having higher levels of priority, data messages having the same priority are transmitted according to a set of rules common to all of the stations. That is, a queue in one of the stations is configured to delay and/or transmit data messages of a given priority level according to a set of rules that applies identically to the queue of any other station that handles data messages of that same priority level. Transmission opportunities are thus fairly allocated between all queues containing data messages of the same priority level.

21 Claims, 6 Drawing Sheets

SYSTEM AND METHOD FOR ORDERING DATA MESSAGES HAVING DIFFERING LEVELS OF PRIORITY FOR TRANSMISSION OVER A SHARED COMMUNICATION CHANNEL

FIELD OF THE INVENTION

The present invention relates generally to media control in communication networks and, more particularly, to a method and apparatus for classifying and ordering data messages prior to their transmission over a shared communication channel.

BACKGROUND OF THE INVENTION

Quality of service (QoS) mechanisms allocate transmission resources to different types or classes of data traffic so that certain traffic classes can be preferentially served over other classes. For example, in a network that supports multimedia services like video-on-demand, video conferencing, online brokerage, and electronic commerce, a QoS mechanism can prioritize time-sensitive multimedia data streams so that their packets are transmitted—over a communication medium or channel shared by two or more terminals or stations—with less delay and/or at a higher rate than packets of data streams less affected or unaffected by delay.

Local area networks (LANs) are increasingly used to transfer data, including multimedia data streams that have various QoS requirements. A multiple layer communication protocol "stack" such as the OSI reference model implements communication over the typical LAN. According to this model, the media access layer (MAC) is responsible for access control of a shared communication channel. A significant objective of any LAN is to allocate access to a shared communication channel as equitably as possible between the stations competing for it. A straightforward realization of this would be to implement, via the media access layer, a QoS scheme in which each of two time-sensitive streams of multimedia traffic—with each originating at a different station on the LAN—is assigned an identical level of transmission priority.

Consider, however, a scenario in which the first station has two distinct classes of traffic to transmit (e.g., from both a high priority class and a lower priority class) while the second station has only traffic from the lower priority class to transmit. At the first station, the higher priority class of traffic would be preferentially treated to the detriment of the lower priority class of traffic since both classes compete for the same transmission opportunity. The lack of any higher priority class of traffic to transmit at the second station, on the other hand, benefits the lower priority class of traffic insofar as there is no need to yield a transmission opportunity to a higher priority data message. As such, a need arises for a system and method of ordering data messages—prior to their transmission over a shared communication channel—such that traffic of equal priority is handled in a fair and equitable manner by all stations contending for access to the shared communication channel.

SUMMARY OF THE INVENTION

The aforementioned need is addressed, and an advance is made in the art, by a communication network having a plurality of stations that share a communication medium or channel. Each station of the network has a plurality of internal queues for accumulating and transmitting data messages over the shared communication channel. Each internal queue of a station individually accumulates and releases, for transmission during an appropriate transmission opportunity, data messages that have a specific traffic classification and, hence, a different level of priority than those accumulated and released by other internal queues of that station. At both the local (i.e., within each station) and the network-wide (i.e., among all stations) level, preferential access to the shared communication channel is given to data messages having higher levels of priority over those having lower levels of priority. However, in accordance with an illustrative embodiment of the present invention, the release, for transmission, of data messages having the same level of priority is governed by a set of parameters that is common for all stations of the network. That is, an internal queue in any one of the stations is configured to delay and/or release data messages of a given priority level according to a set of rules that applies identically to the internal queue of any other station that handles data messages of that same priority level. Transmission opportunities are thus fairly allocated between all queues containing data messages of the same priority level.

A method according to an illustrative embodiment of the invention comprises directing, to a first output queue at a first station of a communication network, data message units that are to be transmitted over a communication medium and that have a first traffic classification. The method further comprises directing to a second output queue at the first station, data message units that are to be transmitted over the communication medium and that have a second traffic classification. Each queue senses the communication medium for an opportunity to transmit data message units according to the aforementioned set of rules. An attempt is made to retransmit, after a respective interval defined differently for each corresponding traffic classification, any message data unit transmitted by the first station that destructively interferes with a message data unit transmitted by another station over the communication medium, or with other causes of interference.

If the first and second output queues at the first station each contain data message units that are scheduled to be transmitted during the same sensed transmit opportunity, they could benefit from that prior knowledge and, by way of illustrative example, at least one message data unit from the first output queue can be preferentially transmitted over a message data unit from the second queue. For purposes of this specification, preferential treatment encompasses one or more measures that guarantee—for streams of higher priority data message units—an average transmission rate that is higher and/or a maximum delay before transmission that is lower than that which is guaranteed to streams of lower priority data message units. Such measures include, by way of illustrative example, deferring transmission of (i.e., "preempting") a lower priority message data unit from the second output queue to ensure that the higher priority message data unit can be transmitted during a specific transmit opportunity.

According to the present invention, however, an effort is made to fairly allocate transmission opportunities among every queue having data message units of the same traffic classification to transmit-regardless of where each queue happens to be among the stations of the network. Specifically, each station is configured so that a queue containing higher priority data message units has no more impact on the scheduling order of a local queue (i.e., a queue in the same station) than it does on the scheduling order of any external queue (a queue at any other station) that contains data message units of the same, lower priority level. To this end, in the illustrative embodiment of the invention, at least one attempt is made to transmit a data message unit, from the second output queue, that has been pre-empted by a higher priority message data unit from the first output queue, as if that pre-empted message data unit had already been transmitted and had experienced destructive interference. As such, the probability that a message data unit of a given priority level will be transmitted during a subsequent transmission opportunity is substantially the same regardless of whether it was actually transmitted and destructively interfered with a message data unit from another station or it was internally pre-empted by a higher priority message data unit before it could be transmitted

BRIEF DESCRIPTION OF THE DRAWINGS

The various features and functions of the present invention will be better understood by reference to both the detailed description of the various illustrative embodiments which follows and the accompanying drawings, in which.

DETAILED DESCRIPTION

Initially, it should be noted that it may be desirable to increase the probability of successful transfer of (MSDUs) across a shared channel such, for example, as the wireless medium employed by the illustrative embodiment of the present invention. In such cases, message data units can be partitioned into a sequence of smaller data units prior to transmission. The process of recombining a set of fragment data units into an MSDU is known as defragmentation. For the purposes of the present specification, the terms message data units are intended to encompass each of the aforementioned units, as well as any other units, which can be transmitted and received as delimited frames of digital bits.

Figure 1:
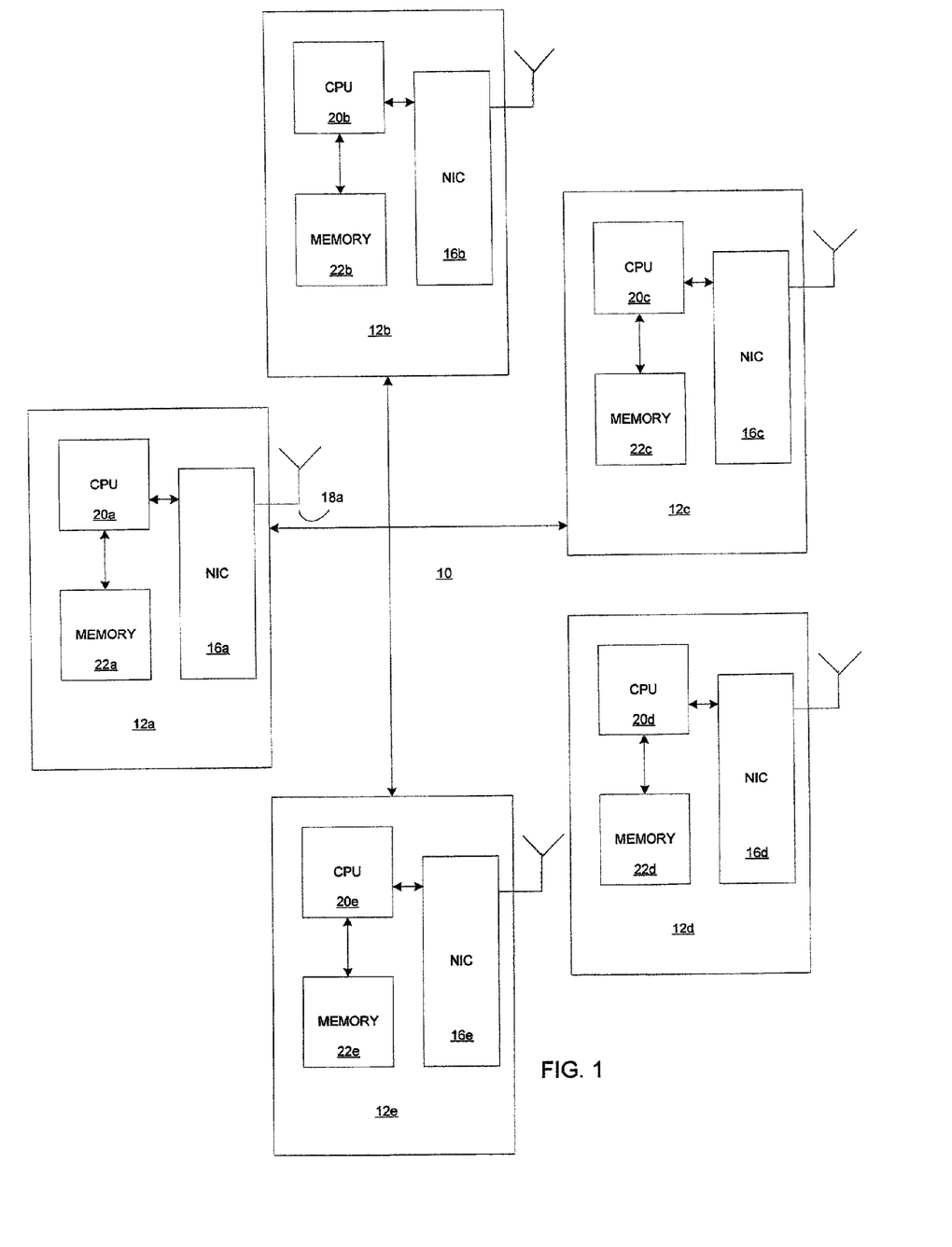
FIG. 1 depicts an exemplary embodiment of a communication network adapted for operation in accordance with the teachings of the present invention.

An illustrative embodiment of a communication network 10 employing the teachings of the present invention is shown in FIG. 1 and includes a plurality of stations— generally indicated at 12a–12e—that are configured to receive and transmit message units over a shared communication medium. As will be readily appreciated by those skilled in the art, various types of wired communication media such as, for example, coaxial cable, twisted wire pairs of electrical conductors, and/or optical fiber, might be used to implement the requisite network interconnections between stations. In the illustrative example of FIG. 1, however, the stations form a wireless local area network (WLAN) and are adapted to communicate over a wireless medium 14 such as radio or optical frequency propagation through the interior space of an office building. Coupling of the stations in a WLAN arrangement, because it does not require physical or "hard-wired" connections, will often be especially advantageous when installing a new communication network within existing offices.

Although a network in which a wireless medium functions as a shared channel is illustrated and described in detail in the present specification, this is for pedagogical purposes only and it should be understood that the teachings of the present invention are also applicable to any other network in which two or more stations share a common transmission channel. It should also be understood that while a point to multipoint (e.g., a hub) topology is shown in FIG. 1, the present invention is applicable to other network architectures (e.g., ring networks, mesh networks, etc.) as well. The stations themselves can be a variety of devices such, for example, as personal computers, computer peripheral devices, gateway devices to other networks, or any other devices that require data communication services.

Embodiments of the invention use a variety of radio or optical frequencies and transmission methods. In the illustrative embodiment of FIG. 1, the stations communicate using radio frequency spread spectrum transmissions in the Industrial Scientific and Medical (ISM) band in the range of 2.4 GHz using an overall bandwidth of approximately 83 MHz. The transmission technique provides a raw system data rate of 1 Mb/s between stations. As will be readily ascertained by those skilled in the art, the transmission characteristics of the individual stations 12a–12e can vary according to such factors as the transmission power level, the physical distance between stations, the presence of any interfering structures betweens, and the proximity to any interfering signal sources. Accordingly, the achievable throughput over the communication medium may be substantially lower than the raw data rate.

In any event, and with continued reference to the illustrative communication network of FIG. 1, it will be seen that each of wireless stations 12a–12e includes a respective network interface controller (NIC) 16a–16e that is coupled to a corresponding antenna 18a–18e. Each wireless station further includes a general-purpose processing unit (CPU) 20a–20e and a memory 22a–22e. Application programs stored within the memory at each wireless station are executed by its CPU and communicate over the WLAN through its NIC.

Figure 2:
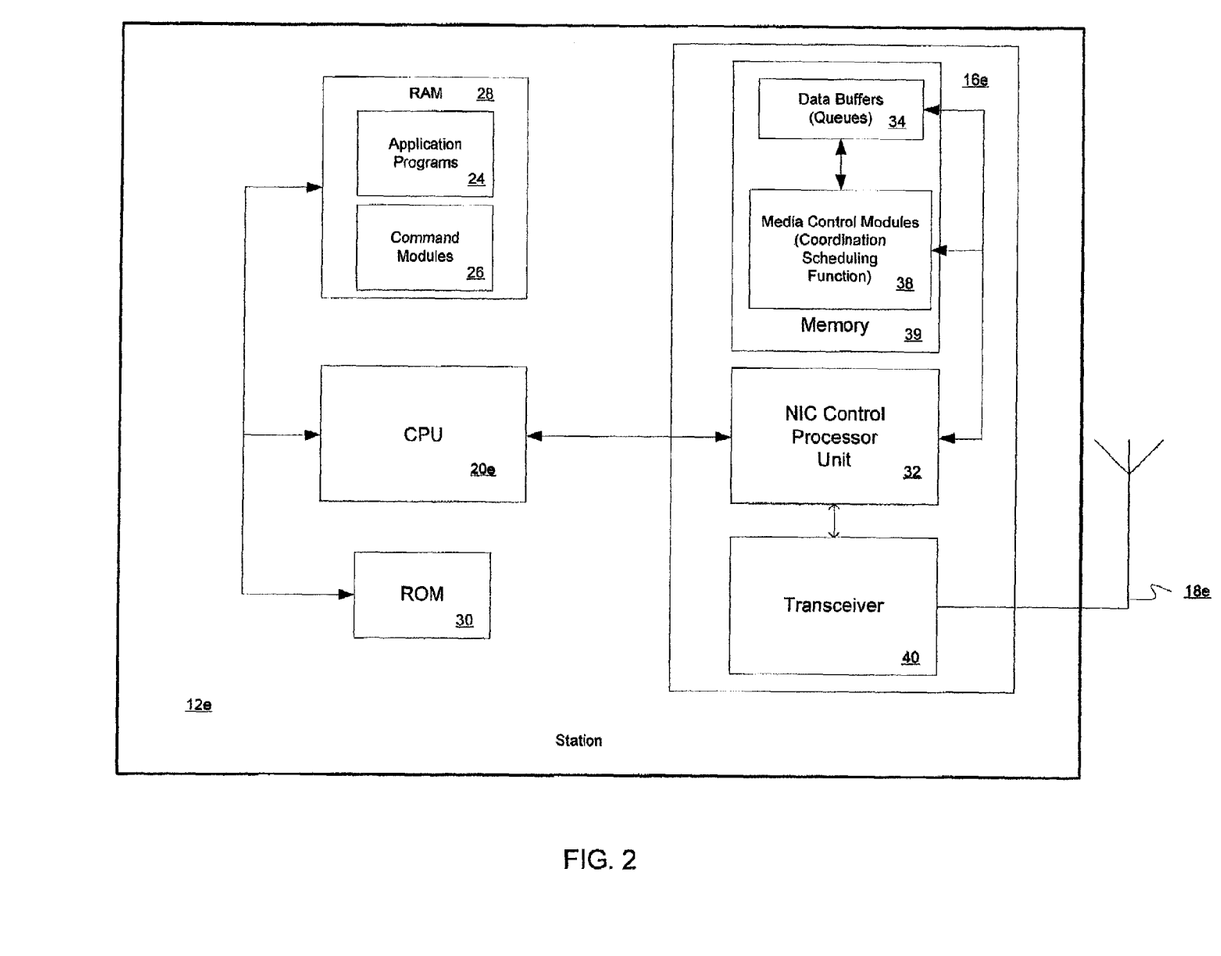
FIG. 2 shows elements of an individual station of the communication network of FIG. 1.

With reference now to FIG. 2, there is shown an arrangement of the hardware components of an exemplary network station—indicated generally at 12e. General purpose CPU 20e executes application programs 24 and communication modules 26 stored in working memory 28 such as dynamic RAM. Prior to initialization of the station, the application programs and communication modules are stored within a non-volatile memory 30 such as, for example, a magnetic disk or read only memory (ROM). CPU 20e communicates with NIC 16e, these components being coupled to one another by, for example, a PCMCIA or ISA bus.

NIC 16e comprises a control processor 32 used for data buffers 34 and media access control and queue scheduling function modules 38 which reside in memory 39, and which execute on control processor 32. Control processor 32 communicates with transceiver 40 that, in turn, is coupled to antenna 18e. In a conventional manner, transceiver 40 converts a baseband data signal into a radio frequency signal that is transmitted through antenna 18e. Transceiver 40 also converts a radio frequency signal present invention, transceiver 28 implements a direct sequence (spread spectrum) transmission technique to reduce interference from other transmission sources. Such a transceiver may be constructed using, for example, a "PRISM" chipset (not shown) commercially available from Intersil Corporation that includes a quadrature modem, a voltage controlled oscillator, a radio frequency to infrared frequency converter, an RF power amplifier with transmit/receive switch, and a low noise RF amplifier.

Figure 3:
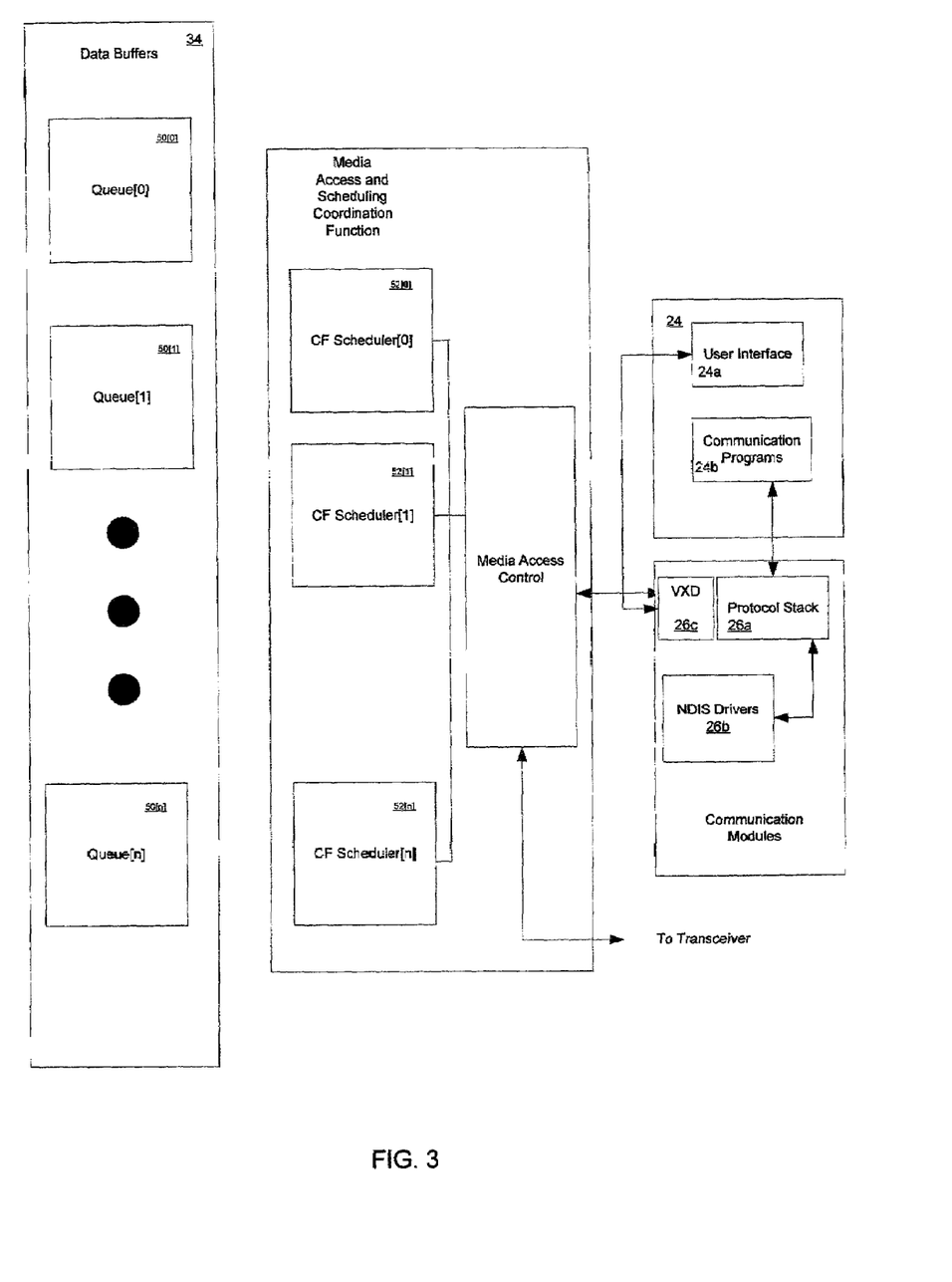
FIG. 3 is a block diagram depicting, in greater detail, the software implementation of media access control in accordance with the illustrative embodiment of FIGS. 1 and 2.

FIG. 3 exemplifies, in greater detail, the software implementation of media access control in accordance with the illustrative embodiment of FIGS. 1 and 2. As seen in FIG. 3, the application programs 24 residing in station memory 28 include, for example, a user interface program 24a that is used by a network administrator (or other authorized user) to interactively specify QoS requirements. Also residing in station memory 28 are communication programs 24b which communicate with similar communication programs executing at other stations. Each communication session comprises a single, unidirectional data stream between two stations.

In a conventional manner, each session communicates through a standard communication protocol stack 26a, implementing a suitable network transmission protocol such, for example, as TCP/IP, UDP/IP or the like. In the illustrative example of FIG. 3, each station operates using a commercially available operating system such as Microsoft Windows 2000 (NT) or Windows 98. Microsoft Corporation furnishes a protocol stack 26a specifically configured for use with those operating systems. Application programs 24, such as user interface program 24a and communication programs 24b communicate with protocol stack 26a in a conventional manner.

In the Microsoft Windows-based implementation of FIG. 3, protocol stack 26a also communicates with a Network Driver Interface Specification (NDIS) driver 26b that provides the interface to media control module 38 executed by control processor 32 of a station's network interface controller (NIC) as NIC 16e of station 12e. As will be readily appreciated by those skilled in the art, an NDIS driver contains operating code that controls the NIC and provides a standard interface for higher level protocols implemented in protocol stack 26a. Calls are made, by the higher level protocols, to the NDIS driver to submit data message units for transmission to network 10 and to retrieve data received from the network. As data message units arrive from network 10, media control module 38 directs them to lower level controller code in the operating system. This lower level controller code calls NDIS driver routines to forward the arriving data message units to protocol stack 26a for processing.

In order to support QoS sessions, a virtual device driver (VxD) 26c is included within communication module 26. VxD 6 accepts QoS parameters specified via user interface program 24b and directs it to NDIS driver 26b. Using interface program 24b, a network administrator can specify that data streams addressed to a particular port on other stations have a particular minimum data rate and maximum delay requirement. Within NDIS driver 26b, data message units arriving from protocol stack 26a are tagged in a way that allows QoS and non-QoS sessions to be distinguished from one another and these tagged message units are then transferred to media control module 38. The manner in which this tagging procedure is carried out admits of substantial variation. For example, in accordance with an illustrative embodiment of the present invention, a number n of discrete traffic classifications are established for the data message units constituting the various data streams—with each traffic classification having, as will be explained in greater detail shortly, a corresponding contention window that circumscribes the QoS criteria specifiable for each session. Using the information received via VxD 26c, data message units from a given session are mapped to one of these n traffic classifications and placed in a corresponding one of queues $50_0$ through $50_n$ within data buffers 34. Once placed within one of the queues, the data message units are released in accordance with a coordination function (CF) implemented in a scheduler 52 which prioritizes the transmission of data message units from each queue in accordance with a defined access control algorithm In the illustrative communication network 10 of FIG. 1, the media access control (MAC) algorithm employed is a distributed coordination function known as carrier sense, multiple access with collision avoidance or CSMA/CA. This function is implemented at all stations, so that any of stations 12a–12e having data messages to transmit must first sense the medium to determine if another station is already transmitting. As will be explained in greater detail later, the CSMA/CA distributed algorithm employed by the illustrative embodiment of the present invention specifies that sequences of data messages be separated by a gap having an established minimum duration. Only when a station has determined that the medium has been idle for this required duration may it attempt to transmit any of the data messages within its data buffers 34.

A wireless local area network constructed in accordance with an illustrative embodiment of the present invention provides differentiated access, to the wireless communication medium, for eight traffic categories. Accordingly, each station has no more than eight prioritized output queues (as queues $50_1$ through $50_n$ of FIG. 3), one for each category. A station may, of course, implement fewer than eight physical queues in data buffers 34. In such event, the system can be configured to map the eight exemplary traffic categories into the smaller number of queues.

In the exemplary embodiment of the present invention, each output queue competes for transmission opportunities ("TxOPs") using a coordinated scheduling function. According to this scheduling function, the minimum specified idle duration period—separating a message data unit which has already been transmitted over the wireless medium from a subsequent message data unit to be transmitted from one of the output queues—is a distinct value that differs for each traffic classification and, hence, each queue The corresponding minimum specified idle duration period specified for each traffic category can, for example, be set as a default at each station or assigned by a remote administrator. The scheduling function of the illustrative embodiment further specifies a contention window CWmin from which a random back off is computed for each queue. In accordance with an illustrative embodiment of the present invention, the contention window is not fixed but, rather, is a variable window, assigned to each queue on the basis of traffic classification. After the aforementioned medium idle time, a random back off period is generated for each queue for an additional deferral time before transmitting, unless the corresponding back off timer already contains a non-zero value. In that event, the selection of a random number is not needed and not performed. This process minimizes collisions during contention between multiple stations that have been deferring to the same event.

To both accommodate QoS services and ensure a fair allocation of transmission opportunities to all stations having traffic of the same priority level to transmit, lower priority queues defer to higher priority queues within the same station, collisions between competing queues within a station are resolved within the station such that the higher priority queue receives the TxOP, and the lower priority colliding queue(s) behave as if there were an external collision on the wireless medium.

Figure 4:
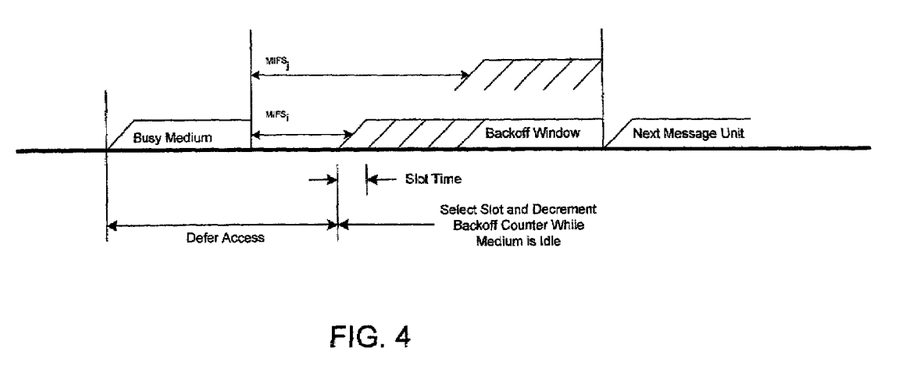
FIG. 4 is a graphical representation depicting the assignment of minimum idle times and back off periods to different queues of a station in accordance with an illustrative embodiment of the present invention.

With particular reference to FIG. 4, it will be appreciated that a station is allowed a TxOP for a message unit of a particular traffic class if its carrier sense mechanism determines that the medium is idle at a corresponding time slot boundary after a correctly-received frame, and the back off time for that traffic class/queue has expired. According to the illustrative embodiment of the invention, the highest priority traffic class is directed to a queue that waits for a minimum interframe space interval $QIFS_0$ before decrementing its back off counter while the lowest priority traffic class is directed to a queue that waits for a minimum interframe space interval $QIFS_7$ before decrementing its back off counter. As will be readily appreciated by those skilled in the art, the precise number of queues can vary from network to network so long as some mechanism exists for mapping the message data units to the existing queues in a manner that accommodates their relative priorities.

A station adapted for use in a QoS-enabled network in accordance with an illustrative embodiment of the present invention calculates and maintains a back off time and contention window for a queue when there are message data units to be transmitted from that queue. The back off calculation draws from differentiated intervals and replicates a contention window state for each queue i as follows:

Back off Time[i]=Random(i)×aSlotTime

Where:
Random(i)=Pseudo random integer drawn from a uniform distribution over the interval [1,CW[i]+1];
CW[i] is an integer within the range of values CWmin[i] and CWmax (or optionally aCWmax[i] if available); and
CWmin[i]≦CW[i]≦CWmax.

Figure 5:
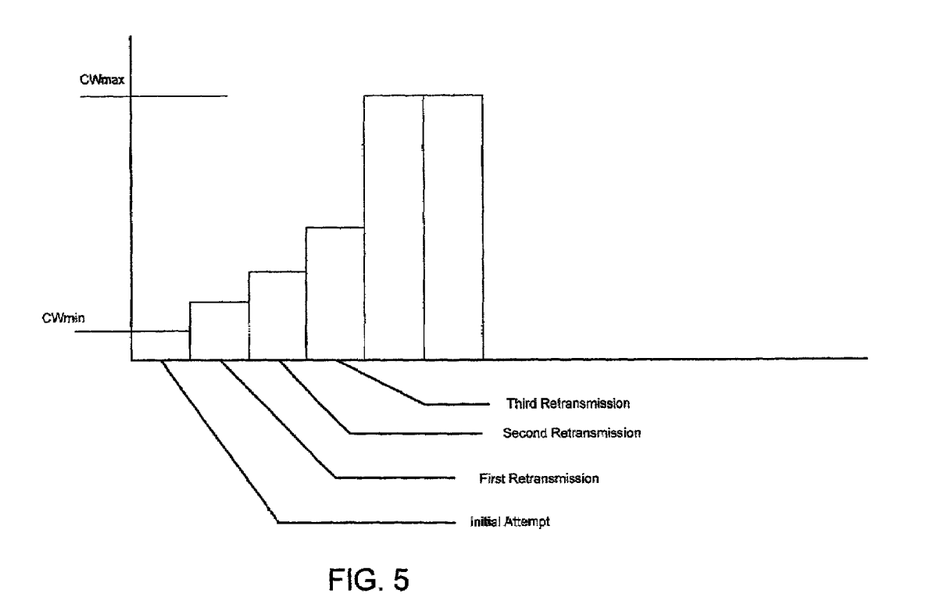
FIG. 5 is a graphical representation depicting the exponential increase in a queue's contention window during successive efforts to transmit a particular data message unit, as when either an actual collision with a transmission by another station or preemption by a higher queue (i.e., a "virtual collision") occurs.

In accordance with the illustrative embodiment of the present invention, every station maintains, for each queue, a contention window (CW[i]) parameter and also Queue Short and Long Retry Counts (QSRC[i] and QLRC[i], respectively) that take an initial value of zero. A QSRC[i] is incremented whenever a respective Queue Short Retry Count associated with a message data unit in a corresponding queue is incremented. A QLRC[i] is incremented whenever a respective Queue Long Retry Count associated with a data in a corresponding queue is incremented. As best seen in FIG. 5, the contention window CW[i] of a queue takes the next value in a series every time an unsuccessful attempt to transmit a message data unit causes either Retry Counter of that queue to increment, until CW[i] reaches the value of CWmax. A retry is defined as an entire sequence of frames sent, separated by QIFS intervals, in an attempt to deliver a message data unit. Once it reaches CWmax, the contention window of a queue remains at the value of CWmax until it is reset. This improves the stability of the access protocol under high load conditions. It should be noted that although a single value of CWmax common to all stations is suggested in FIG. 5, it is also possible to provide differentiated CWmax[i] values for the respective queues.

In accordance with the illustrative embodiment of the present invention, the CWmin[i] values are set and updated by a QoS Parameter Set element that provides information needed by the stations for proper operation of the QoS facility during each contention period (CP). This information includes the CP TXOP limit and the contention window values and QIFS values for prioritized channel access. The format of the QoS Parameter Set element is shown in Table I

TABLE I

QoS Parameter Settlement Format

| Element ID | Length | CP TXOP Limit | CWmin[TC] values | QIFS[TC] values | CWPFactor[TC] values |
|---|---|---|---|---|---|
| (12) | (26) | (2 octets) | CWmin[0]...<br>CWmin[7]<br>(8 octets) | QIFS[0]...<br>QIFS[7]<br>(8 octets) | CWPFactor[0]...<br>CWPFactor[7]<br>(8 octets) |

The Contention Period TxOP limit is a 2-octet field that specifies the time limit on TxOPs by the stations. All TxOPs during the CP last no longer than the number of 16-microsecond periods specified by the CP TxOP limit value. A CP TxOP limit value of 0 indicates that each TxOP during the CP can be used to transmit a single at any rate in the operational rate set of the QBSS.

The CWmin[TC] values field contains 8 octets which specify, in the illustrative embodiment, eight contention window values, for the eight traffic categories 0 through 7, respectively. Each contention window value is 1 octet in length and contains an unsigned integer. CWmin[TC] values update the CWmin[TC] values when received by a station.

The QIFS[TC] values field contains 8 octets which specify, in the illustrative eight traffic class example, eight minimum idle period values (i.e., $QIFS_0$ through $QIFS_7$), for traffic categories 0 through 7, respectively. Each QIFS value is 1 octet in length and contains an unsigned integer. QIFS[TC] values are updated when received by a station. The CWPFactor[i] (Contention Window Persistence Factor) field is one octet in length and indicates the factor in units of 1/16 ths, used in computing new CW[i] values on every unsuccessful attempt to transmit a of traffic category i.

The QoS Parameter Set element may be transmitted by a QoS-enabled network access point via beacon frames and probe response frames broadcast to all or specific stations, although its use is not necessarily limited to those frames. The QoS Parameter Set element can be used by a network administrator to establish policy (by overriding default MIB values), to change policies when accepting new stations or new traffic, or to adapt to changes in offered load.

To compute the new CW[i] value, denoted CWnew[i], from a old CW[i] value, denoted CWold[i], in the event of a collision, a station chooses a value of CWnew[i] which meets the following criterion:

CWnew[i]>=((CWold[i]+1)*PF)−1

Where the persistence factor, PF, is computed using the following procedure:

The CWPFactor[i] (Contention Window Persistence Factor) corresponding to each queue[i] is distributed in a CF parameter set element as described above. Each CWPFactor[i] field is one octet in length and indicates a scaling factor in units of $\frac{1}{16}$ ths. PF is CWPFactor[i] divided by 16 and optionally rounded up to the nearest convenient fractional resolution.

Each respective CW[i] resets to CWmin[i] after every successful attempt to transmit a from the corresponding queue, when QLRC for that queue reaches the LongRetryLimit, or when QSRC for that queue reaches the ShortRetryLimit. The QSRC for a queue is reset to 0 whenever an acknowledgement is received in response to a transmission from that queue. The QLRC for a queue is also reset to 0 whenever an acknowledgement is received in response to transmission of a. In accordance with an illustrative embodiment of the invention, the set of CW[i] values are sequentially ascending integer powers of 2, minus 1, beginning with a specified CWmin[i] value, and continuing up to and including a specified CWmax value.

Figure 6:
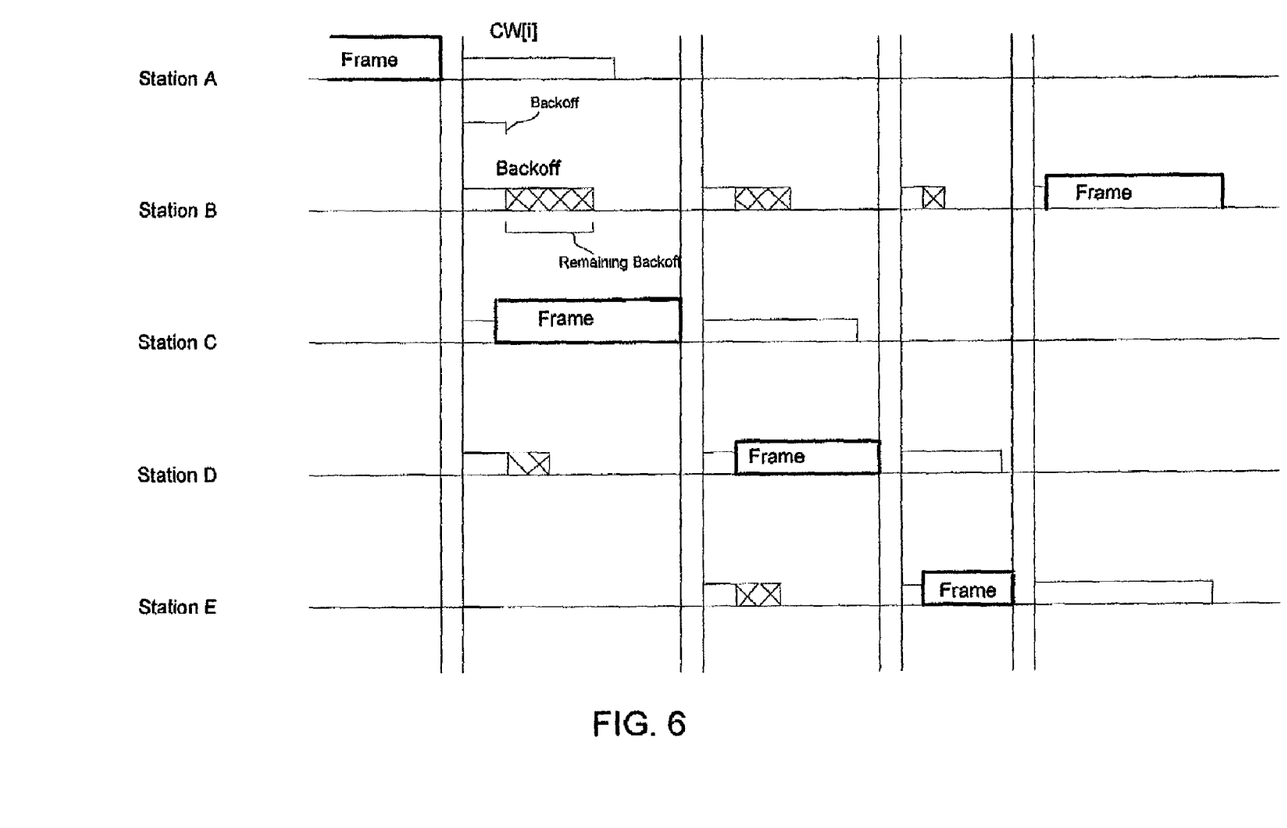
FIG. 6 is a graphical representation depicting multiple stations sensing a medium and waiting during the appropriate idle time and back off period according to an illustrative embodiment of the present invention.
Figure 7:
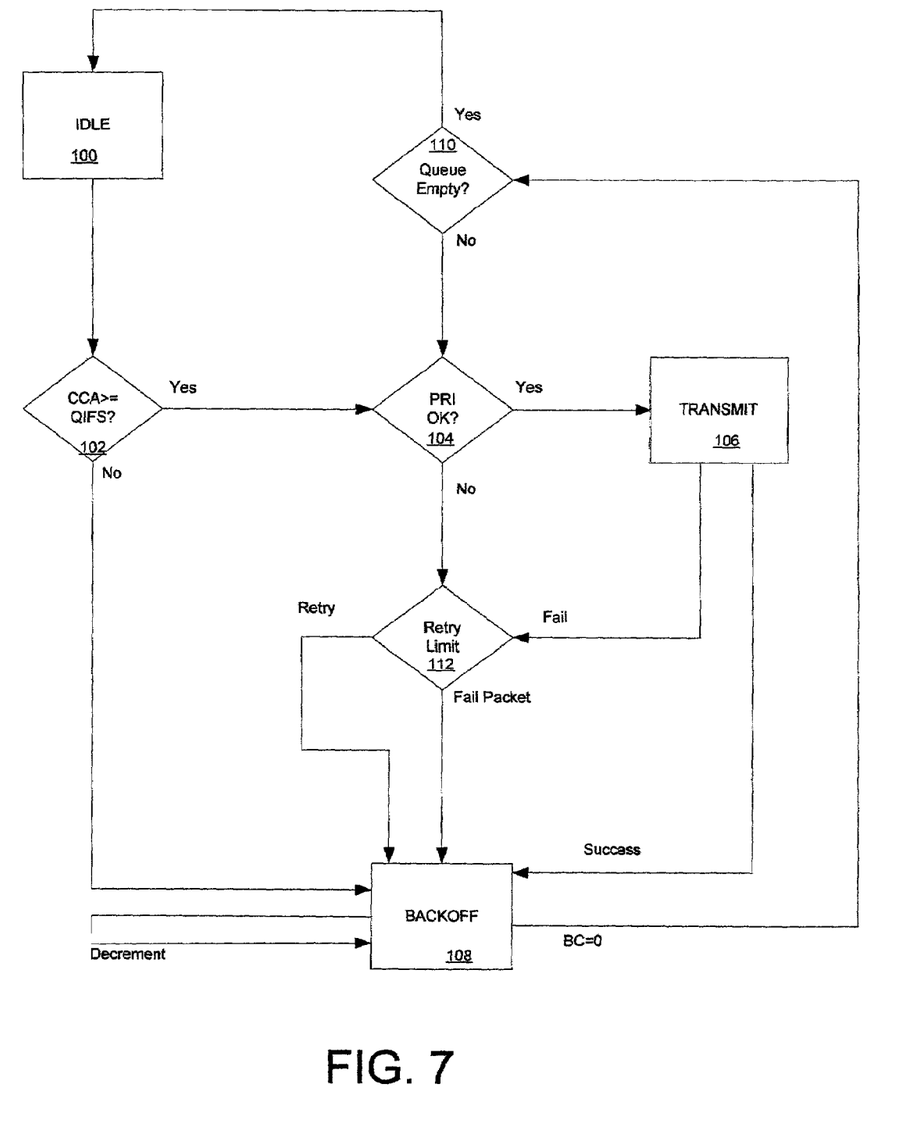
FIG. 7 is a flow chart depicting a state machine for an access method implemented in accordance with an illustrative embodiment of the present invention.

With reference now to FIGS. 6 and 7, the back off procedure invoked whenever a station desires to transfer a message data unit and finds the medium busy, or when a higher priority queue within a station pre-empts transmission of a message data unit from a lower priority queue will now be described in greater detail. To begin the back off procedure, each queue sets its back off timer to a random back off time. For each queue, back off slots follow a corresponding QIFS[i] period during which the medium was determined to be idle for the duration of the QIFS[i] period.

A station performing the back off procedure uses the carrier sense mechanism to determine whether there is activity during each back off slot. The back off and contention scheme of the illustrative embodiment is shown in FIG. 6. If no medium activity is indicated for the duration of a particular back off slot, then the back off procedure for each queue decrements its back off time by a slot time period. If the medium is determined to be busy at any time during a back off slot, then the back off procedure is suspended, that is, the back off timers do not decrement for that slot. The back off procedure does not resume for any queue until the medium has been determined to be idle for the duration of a corresponding QIFS[i] period. Transmission of a message data unit from a queue commences whenever the back off timer for that queue reaches zero. According to the present invention, however, if several back off timers (i.e. those of two or more queues within the same station) reach zero at the same slot, then the highest priority frame is transmitted, and any lower priority(s) defer and execute the retry procedure, as specified above, by appropriately setting their CW[i] values for the deferred frames as if they had experienced a transmit failure.

In the case of successful acknowledged transmissions, the aforementioned back off procedure begins at the end of a received acknowledgement message. In the case of unsuccessful transmissions requiring acknowledgment, the back off procedure begins at the end of an acknowledgement timeout interval. If the transmission was successful, the CW[i] value reverts to CWmin[i] before the corresponding random back off interval for a queue is chosen, and the respective QSRC[i] and/or QLRC[i] counts are updated as described above. This assures that transmitted frames from a station are always separated by at least one back off interval. The effect of this procedure is that when multiple stations are deferring and go into random back off, then the station selecting the smallest back off time using the random function will win the contention.

A flow chart depicting a state machine for the illustrative access method set forth above is shown in FIG. 7. As indicated above, each queue i has a state consisting of a state variable {idle, back off, transmit}, a back off counter BC[i] initialized to INF, short and long retry counters QSRC[i] and QLRC[i], a contention window CW[i], CWmin, CWmax, and short and long retry limits. A frame arriving for a particular queue[i] is simply added to that queue. The access mechanism delivers transmission opportunities to the queues.

The access mechanism for each queue[i] is:

Idle:

On the arrival of a data message unit in queue[i], the process proceeds from idle block 100 to decision block 102. At block 102, if the medium is determined to be idle for longer than QIFS[i], the back off counter is set to zero and the process advances to decision block 104. At decision block 104, a check is made to make sure that no higher priority queue has a message data unit scheduled for transmission during the same transmission opportunity. That is, a check is made to see if the back off counter of another, higher priority queue has also been set to zero. If the check at decision block determines that no higher priority queue intends to utilize the same transmit opportunity, and therefore confirms that it is OK to transmit, an attempt is made at block 106 to transmit the message data unit from the current queue.

Backoff:

If, however, sensing of the medium at decision block 102 indicates that the medium has not yet been idle long enough, the contention window CW[i] for queue[i] is set to CWmin[i] and the back off counter BC[i] is set to count down from a random value between 0 and CW[i]. The process then proceeds to back off procedure block 108.

At block 108, for each idle time slot subsequent to the medium having been idle for QIFS[i], the back off counter decrements one from counter BC[i]. Once the back off counter BC[i] reaches zero, the process enters decision block 110. If there is a message data unit in the queue requiring transmission, the process advances to block 104 to make sure no higher priority message data unit is to be transmitted during the same transmission opportunity. If the check at block 104 is OK, an attempt is made at block 106 to transmit the message data unit from the queue. If the check at block 110 determines that no message data units remain in the queue, the process returns to the idle state at block 100.

Transmit:

If no higher priority back off counter is set to zero at decision block 104, an attempt is made to transfer a message data unit from the queue. If no acknowledgement is received, a retry procedure is implemented. After a successful transmission, retry counters (described below) are reset if appropriate, the message data unit is advanced out of the queue, the contention window CW[i] for that queue is set to CWmin[i], the back off counter BC[i] is set to a random value between 0 and CW[i] and the process proceeds to back off block 108. If a transmission fails, the retry procedure is implemented.

Retry:

In accordance with the illustrative embodiment of the present invention, it can become necessary to implement a retry procedure for "retransmitting" a message data unit for several different reasons. First, a message data unit being transmitted from a queue of one station may collide with one being transmitted by another station. Alternatively, during decision block 104, it may be determined that another queue within the same station may contain a message data unit of a higher priority traffic classification. That is, the back off counter in each of two or more queues might have decremented to zero simultaneously. In that case, the higher priority queue receives the transmission opportunity and the other queue(s) proceed to the retry procedure as if an attempt had been made to transmit them. Although these lower priority queues had not actually been transmitted, they are treated this way in order to ensure a fair allocation of transmission opportunities.

Each time the retry procedure is invoked for a message data unit, a retry counter is incremented at block 112 until a limit is reached. If the corresponding retry limit for a queue has not been exceeded, its contention window CW[i] is set to a value between 2.times ×CWmin[i] and CWmax. The corresponding back off counter is set to a random value between 0 and CW[i] and the procedure returns to back off block 108. Once the retry limit has been exceeded, the appropriate retry counters are reset, the message data unit is removed from the queue, and CW[i] and back off counter BC[i] is re-initialized to CWmin[i] and a random value between 0 and CWmin[i], respectively.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
   directing to a first output queue at a first station of a communication network, message data units to be transmitted over a communication medium and having a first traffic classification;
   directing to a second output queue at the first station, message data units to be transmitted over the communication medium and having a second traffic classification; and
   sensing the communication medium for an opportunity to transmit message data units without interference from message data units transmitted by a second station, according to sets of rules that vary by traffic classification yet are common to the first station and the second station.

2. The method of claim 1, further including allowing only one of the first and second output queues to transmit, if the first and second output queues each contain message data units scheduled to be transmitted during a particular opportunity to transmit, according to said sets of rules.

3. The method of claim 1, further including attempting to retransmit, after a respective interval defined differently by each said set of rules, any message data unit transmitted over the communication medium by a station that collides with a message data unit transmitted by another station.

4. The method of claim 3, further including attempting to initially transmit a first message data unit from the second output queue of the first station, in accordance with the set of rules corresponding to the traffic classification thereof, as if an unsuccessful attempt to transmit the first message data unit had already been made during a previous transmission opportunity.

5. The method of claim 4, wherein an attempt is made to transmit the first message data unit after an interval specified by the set of rules corresponding to the traffic classification of the second queue.

6. The method of claim 5, wherein the interval is within a respective random variable window having a corresponding minimum and maximum duration.

7. A method for media access control in a communication network which includes a plurality of communication stations adapted to communicate over a shared communication medium and to support quality of service classes of communication sessions wherein message data units corresponding to one of said quality of service classes has a different priority level than message data units corresponding to another of said quality of service classes, comprising:
   directing to a first output queue at a first station of the communication network, message data units to be transmitted and having a first level of priority;
   directing to a second output queue at the first station, message data units to be transmitted and having a second level of priority;
   sensing the communication medium for an opportunity to transmit data message units without colliding with data message units transmitted by any other station, based on a set of rules that are specific to each priority; and
   if the first and second output queues each contain message data units to be transmitted during a particular opportunity to transmit, invoking a mechanism that preferentially transmits a message data unit by priority level and said sets of rules.

8. The method of claim 7, further including attempting to retransmit over the communication medium, after a respective interval of random duration defined differently for each corresponding level of priority, any message data unit transmitted by the first station that externally collides with a message data unit transmitted by another station over the communication medium; and
   attempting to transmit a message data unit from the second output queue, over which a message data unit from the first output queue was preferentially transmitted, after an interval of random duration applicable to retransmission of an externally colliding message data unit at the second level of priority.

9. A system for exchanging message data units over a communication medium shared by other systems in a local area network, comprising:
   a first output queue adapted to receive message data units having a first traffic classification, said first output queue being operable to release message data units for transmission over a communication medium in accordance with a first set of rules corresponding to the first traffic classification;
   a second output queue adapted to receive message data units having a second traffic classification, said second output queue being operable to release message data units for transmission over a communication medium in accordance with a second set of rules corresponding to the second traffic classification; and a transceiver operative to sense the communication medium for an opportunity to transmit the message data units from each of the first and second output queues, without interference from message data units transmitted by a second station, and to transmit the message data units from each of said first and second output queues according to said first and second sets of rules.

10. The system of claim 9, wherein said communication medium is a wireless channel and wherein said transceiver includes an RF transmitter and antenna.

11. The system of claim 9, further including:

a processor communicatively coupled to the transceiver, the first output queue, and the second output queue, the processor configured to allow only one of the first and second output queues to transmit through the transceiver if the first and second output queues each contain message data units scheduled to be transmitted during a particular opportunity to transmit, according to said sets of rules.

12. The system of claim 9, further including:

a processor communicatively coupled to the transceiver, the first output queue, and the second output queue, the processor configured to attempt to retransmit, after a respective interval defined differently by each said set of rules, any message data unit transmitted over the communication medium by a station that collides with a message data unit transmitted by another station.

13. The system of claim 12, wherein the processor is further configured to attempt to initially transmit a first message data unit from the second output queue of the first station, in accordance with the set of rules corresponding to the traffic classification thereof, as if an unsuccessful attempt to transmit the first message data unit had already been made during a previous transmission opportunity.

14. The system of claim 13, wherein an attempt is made to transmit the first message data unit after an interval specified by the set of rules corresponding to the traffic classification of the second queue.

15. The system of claim 14, wherein the interval is within a respective random variable window having a corresponding minimum and maximum duration.

16. A system comprising:

means for directing to a first output queue at a first station of a communication network, message data units to be transmitted over a communication medium and having a first traffic classification;

means for directing to a second output queue at the first station, message data units to be transmitted over the communication medium and having a second traffic classification; and means for sensing the communication medium for an opportunity to transmit message data units without interference from message data units transmitted by a second station, according to sets of rules that vary by traffic classification yet are common to the first station and the second station.

17. The system of claim 16, further including:

means for allowing only one of the first and second output queues to transmit, if the first and second output queues each contain message data units scheduled to be transmitted during a particular opportunity to transmit, according to said sets of rules.

18. The system of claim 16, further including:

means for attempting to retransmit, after a respective interval defined differently by each said set of rules, any message data unit transmitted over the communication medium by a station that collides with a message data unit transmitted by another station.

19. The system of claim 18, further including:

means for attempting to initially transmit a first message data unit from the second output queue of the first station, in accordance with the set of rules corresponding to the traffic classification thereof, as if an unsuccessful attempt to transmit the first message data unit had already been made during a previous transmission opportunity.

20. The system of claim 19, further including:

means for attempting to transmit the first message data unit after an interval specified by the set of rules corresponding to the traffic classification of the second queue.

21. The system of claim 20, wherein the interval is within a respective random variable window having a corresponding minimum and maximum duration.

* * * * *